US011363337B2

United States Patent
Lee et al.

(10) Patent No.: US 11,363,337 B2
(45) Date of Patent: *Jun. 14, 2022

(54) USER INTERFACE METHOD, SYSTEM, AND DEVICE IN MULTITASKING ENVIRONMENT

(71) Applicant: SAMSUNG ELECTRONICS CO., LTD., Suwon-si (KR)

(72) Inventors: Si-Hyoung Lee, Suwon-si (KR); Nam-Choon Park, Seoul (KR); Yi-Sak Park, Seoul (KR); Jung-Won Kang, Seoul (KR); Ji-Hoon Kim, Seoul (KR); So-Young Shin, Hanam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 96 days.

This patent is subject to a terminal disclaimer.

(21) Appl. No.: 16/593,344

(22) Filed: Oct. 4, 2019

(65) Prior Publication Data

US 2020/0036933 A1 Jan. 30, 2020

Related U.S. Application Data

(63) Continuation of application No. 14/980,849, filed on Dec. 28, 2015, now Pat. No. 10,455,182, which is a (Continued)

(30) Foreign Application Priority Data

Aug. 30, 2005 (KR) .................. 10-2005-0080330

(51) Int. Cl.
*H04N 21/443* (2011.01)
*H04N 21/47* (2011.01)
(Continued)

(52) U.S. Cl.
CPC .......... *H04N 21/47* (2013.01); *G06F 3/0481* (2013.01); *H04N 7/147* (2013.01);
(Continued)

(58) Field of Classification Search
USPC ................ 715/788–792, 794, 716–720, 764, 715/766–767, 778, 781–783; 348/E5.006,
(Continued)

(56) References Cited

U.S. PATENT DOCUMENTS 5,263,084 A 11/1993 Chaput et al.
5,377,317 A 12/1994 Bates et al.
(Continued)

FOREIGN PATENT DOCUMENTS

CN 1573910 2/2005
EP 1530349 A1 5/2005
(Continued)

OTHER PUBLICATIONS

Communication dated May 28, 2018, issued by the European Patent Office in counterpart European Application No. 06 016 697.2.
(Continued)

*Primary Examiner* — Rinna Yi
(74) *Attorney, Agent, or Firm* — Sughrue Mion, PLLC (57) ABSTRACT

In a user interface method, system and device in a multitasking environment, it is possible for a user to view all of a plurality of simultaneously executed applications by assigning different display areas to the plurality of applications. In the method, system and device, priorities of applications already being executed and of additional applications for which execution is requested are determined, and a display area size is determined and assigned to each application according to its priority. The system comprises a set-top box for performing the latter functions and a user
(Continued)

terminal for transmitting a user request, while the device comprises a control unit for performing the latter functions.

17 Claims, 6 Drawing Sheets

Related U.S. Application Data continuation of application No. 11/482,821, filed on Jul. 10, 2006, now Pat. No. 9,258,514.

(51) Int. Cl.

| | | |
|---|---|---|
| H04N 7/14 | (2006.01) | |
| H04N 21/4788 | (2011.01) | |
| H04N 21/485 | (2011.01) | |
| H04N 21/431 | (2011.01) | |
| H04N 21/41 | (2011.01) | |
| G06F 3/0481 | (2022.01) | |
| H04N 21/478 | (2011.01) | |

(52) U.S. Cl.
CPC ... *H04N 21/41265* (2020.08); *H04N 21/4312* (2013.01); *H04N 21/4316* (2013.01); *H04N 21/443* (2013.01); *H04N 21/4438* (2013.01); *H04N 21/478* (2013.01); *H04N 21/4788* (2013.01); *H04N 21/485* (2013.01)

(58) Field of Classification Search
USPC .................................. 348/E5.104, E7.081
See application file for complete search history.

(56) References Cited

U.S. PATENT DOCUMENTS

| | | | |
|---|---|---|---|
| 6,008,809 A | 12/1999 | Brooks | |
| 6,141,003 A | 10/2000 | Chor et al. | |
| 6,384,869 B1 | 5/2002 | Sciammarella et al. | |
| 6,434,556 B1 | 8/2002 | Levin et al. | |
| 6,563,547 B1* | 5/2003 | Smith ............... | H04N 5/44543 348/563 |
| 6,590,618 B1* | 7/2003 | Park ................. | H04N 5/44513 348/734 |
| 6,981,227 B1* | 12/2005 | Taylor .............. | H04N 21/4622 715/768 |
| 7,068,291 B1 | 6/2006 | Roberts et al. | |
| 7,143,428 B1 | 11/2006 | Bruck et al. | |
| 2002/0056083 A1 | 5/2002 | Istvan | |
| 2002/0066101 A1 | 5/2002 | Gordon et al. | |
| 2003/0023742 A1 | 1/2003 | Allen et al. | |
| 2003/0079227 A1 | 4/2003 | Knowles et al. | |
| 2003/0174160 A1 | 9/2003 | Deutscher et al. | |
| 2004/0098746 A1* | 5/2004 | Lee .................. | H04N 21/43615 725/80 |
| 2004/0130568 A1 | 7/2004 | Nagano et al. | |
| 2004/0201608 A1 | 10/2004 | Ma et al. | |
| 2004/0215769 A1 | 10/2004 | Yoshida et al. | |
| 2004/0239812 A1 | 12/2004 | Park et al. | |
| 2005/0022236 A1 | 1/2005 | Ito et al. | |
| 2005/0108655 A1 | 5/2005 | Andrea et al. | |
| 2005/0231529 A1 | 10/2005 | Skwarek et al. | |
| 2005/0275641 A1 | 12/2005 | Franz | |
| 2006/0061597 A1 | 3/2006 | Hui | |
| 2006/0069785 A1* | 3/2006 | Barrett ............... | G06F 3/0481 709/229 |
| 2006/0136917 A1 | 6/2006 | Gebhart et al. | |
| 2007/0275762 A1 | 11/2007 | Aaltone et al. | |

FOREIGN PATENT DOCUMENTS

| | | |
|---|---|---|
| JP | 2000-99231 | 4/2000 |
| JP | 2002-505492 | 2/2002 |
| JP | 2003-046962 | 2/2003 |
| JP | 2003-330715 | 11/2003 |
| JP | 2004-056469 | 2/2004 |
| KR | 1998-0011355 | 5/1998 |
| KR | 2000-0008579 | 2/2000 |
| KR | 2002-0050203 | 6/2002 |
| KR | 2003-0059916 | 7/2003 |
| KR | 10-2004-0022638 | 3/2004 |
| KR | 10-2004-0044574 | 5/2004 |
| WO | 01/77906 | 10/2001 |
| WO | 03/054480 A1 | 7/2003 |

OTHER PUBLICATIONS

Communication issued by the European Patent Office dated Dec. 19, 2017 in counterpart European Patent Application No. 06016697.2.
Examination Report issued dated Jun. 6, 2017 by the European Patent Office in counterpart European Patent Application No. 06016697.2.
European Search Report dated Jan. 2, 2012 issued for corresponding European Patent Application EP 06 01 6697.
Office action from the Chinese Patent Office issued in Applicant's corresponding Chinese Patent Application No. 2006101156239 dated Oct. 10, 2008.
Chinese Office Action dated Dec. 28, 2007, corresponding to Chinese Patent Application No. 200610115623.9.
Korean Decision of Grant dated May 18, 2007, corresponding to Korean Patent Application No. 10-2005-0080330.

* cited by examiner

USER INTERFACE METHOD, SYSTEM, AND DEVICE IN MULTITASKING ENVIRONMENT

CLAIM OF PRIORITY

This application is a continuation application of U.S. patent application Ser. No. 14/980,849, filed Dec. 28, 2015, in the U.S. Patent and Trademark Office, which is a continuation application of U.S. patent application Ser. No. 11/482,821, filed on Jul. 10, 2006, in the U.S. Patent and Trademark Office, now patented as U.S. Pat. No. 9,258,541, which claims the benefit of Korean Patent Application No. 10-2005-0080330, filed on Aug. 30, 2005, in the Korean Intellectual Property Office, the disclosures of which are incorporated herein by reference in their entireties.

BACKGROUND OF THE INVENTION

Technical Field

The present invention relates to a user interface method, system and device in a multitasking environment.

Related Art

A user interface is indispensable in all devices that operate in response to a request from a user. The user interface has been developed to enhance user convenience. The user interface displays user-input information and a corresponding operation status on a display means of the device so that a user can immediately view his or her selection and corresponding results. That is, each time the user makes a specific selection, the user interface displays a corresponding screen on the display means.

However, the user interface can display only one functional screen at a time. Accordingly, a partitioned screen has been used to display several contents. This screen, however, is a mere partitioned screen.

This conventional art is somewhat inconvenient since one functional screen is displayed at a time. Examples of inconvenience in a multi-function set-top box capable of simultaneously performing several functions will be described. Such inconvenience is prominent in multi-function devices. Some of the problems described below are found in all conventional devices, not only those displaying only one screen in response to all user inputs.

Multi-function set-top boxes are realized by combining several advanced technologies including communications technology. Multi-function set-top boxes have several functions, including a communication function, an entertainment function, and a scheduling function, as well as broadcast or video on demand (VoD) receiving functions. These functions are associated with various types of applications. Multi-function devices having two or three functions have been developed in several fields, but no such device has as many functions as the multi-function set-top box. Multi-function set-top boxes will be widely used due to their convenience.

As mentioned above, multi-function set-top boxes have several functions. The multi-function set-top boxes can perform a single function, or they can perform a plurality of functions simultaneously depending on a user=s selection. When the plurality of functions are performed simultaneously, they may be performed independently or in correlation with one another. Examples of the simultaneous performance of a plurality of functions using a multi-function set-top box include making a call (e.g., a video call and a voice call) while viewing a broadcast program, checking a schedule while making a call, retrieving media files to be transferred to others while making a call, and generating a door phone signal indicating a visit by others while viewing a television program. The latter are examples of simultaneous performance of two applications. The multi-function set-top boxes can simultaneously perform three or more applications because of their multiple functions.

Multi-function set-top boxes using a conventional display method and device are inconvenient to users for the reasons given below.

In a conventional display method and device, one application is ended and then another application is started, or one application is displayed and then another application is displayed.

These problems lower user convenience. Accordingly, there is a need for a new display method and device which is suitable for use with a multi-function set-top box.

SUMMARY OF THE INVENTION

It is an object of the present invention to provide a user interface method, system and device in a multitasking environment, which method, system and device are capable of improving user convenience in using a multi-function set-top box.

It is another object of the present invention to provide a user interface method, system and device in a multitasking environment, the method, system and device being capable of preventing a screen of a newly executed application from blocking screens of already executed applications.

It is yet another object of the present invention to provide a user interface method, system and device in a multitasking environment, the method, system and device being capable of enabling users to simultaneously view screens of two associated applications.

According to an aspect of the present invention, a user interface method in a multitasking environment comprises: while at least one application is being executed, receiving a request to execute another application; determining priorities of the already executed application and the newly executed application; determining the size of a display area for each application according to the determined priorities; and displaying the applications on the determined display areas.

The method may further comprise changing the determined sizes of the display areas for the applications in response to a user input.

The newly executed application may be assigned the highest priority, the priorities may be determined in response to a user input, and the priorities may be determined by referring to pre-stored priority information of each application.

The priority may comprise a first level in which an application is assigned 100 percent of an entire display area, a second level in which an application is assigned a display area which is, by a predefined size, larger than that of other current applications that are simultaneously executed, a third level in which an application is assigned a display area which is, by a predefined size, smaller than that of other current applications that are simultaneously executed, and a fourth level in which an application is not assigned a display area and is executed in background.

The priority level assigned to each application may be changed in response to a user request, the change of the priority level in response to the user request is sequentially performed from the first level to the fourth level or from the fourth level to the first level, and the second priority level is assigned to the currently selected one of the simultaneously executed applications.

According to another aspect of the present invention, a user interface system in a multitasking environment comprises: a set-top box responsive to reception of a request to execute another application while at least one application is being executed for determining priorities of the already executed application and the newly executed application, for determining the size of a display area for each application according to the determined priorities, and for displaying the applications on the determined display areas; and a user terminal for transmitting a user request to the set-top box to control the set-top box.

The set-top box may change the determined size of the display area for the application in response to the user request, the priorities may be determined in response to a user request, and the priorities may be determined by referring to a history of applications previously used by a user.

According to yet another aspect of the present invention, a user interface device in a multitasking environment comprises a control unit responsive to reception of a request to simultaneously execute another application while at least one application is being executed for determining priorities of the already executed application and the newly executed application, for determining the size of a display area for each application according to the determined priorities, and for displaying the applications on the determined display areas.

The control unit may change the determined size of the display area for the application in response to user input, and the control unit may determine the highest priority for the newly executed application.

When a new phone call application is executed during the execution of a television reception application, the control unit may determine higher priority for the phone call application.

The control unit may determine a higher priority for a transmitting phone call application than for a receiving phone call application.

The device may further comprise a storage unit for storing priority information of each application, and the control unit may determine the priorities of applications by referring to the priority information stored in the storage unit.

The storage unit may further store size information of the display area determined according to the priorities, and the control unit may determine the size of the display area for each application by referring to the size information of the display area stored in the storage unit.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF EXEMPLARY EMBODIMENTS

The present invention will now be described more fully with reference to the accompanying drawings, in which exemplary embodiments of the invention are shown. This invention may, however, be embodied in different forms and should not be construed as being limited to the exemplary embodiments set forth herein. Rather, these exemplary embodiments are provided so that this disclosure will be thorough and complete, and will fully convey the concept of the invention to those skilled in the art.

Figure 1:
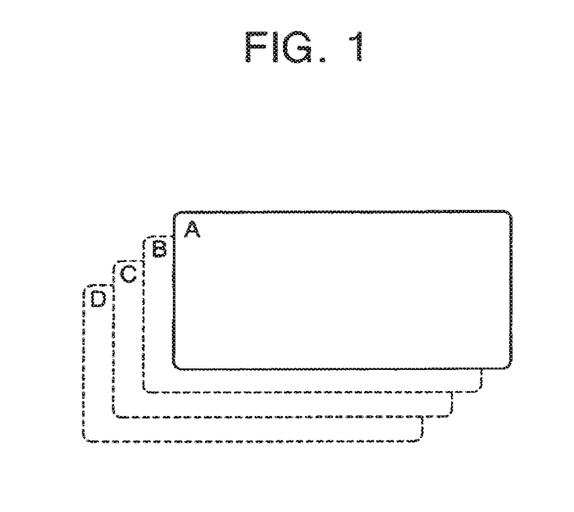
FIG. 1 illustrates an example of a display screen of an interface.

FIG. 1 illustrates an example of a display screen of an interface.

In the display screen of such an interface, only a currently selected application A is displayed. Thus, if a multi-function set-top box using the display screen of FIG. 1 executes one application while executing another application, the screen is switched between the two applications. Accordingly, other applications B, C and D are blocked by a selected application A. Thus, the user cannot simultaneously view two associated screens when executing two associated applications. For example, in the case where the user checks a schedule while viewing a television program, a schedule screen blocks the television program screen.

Figure 2:
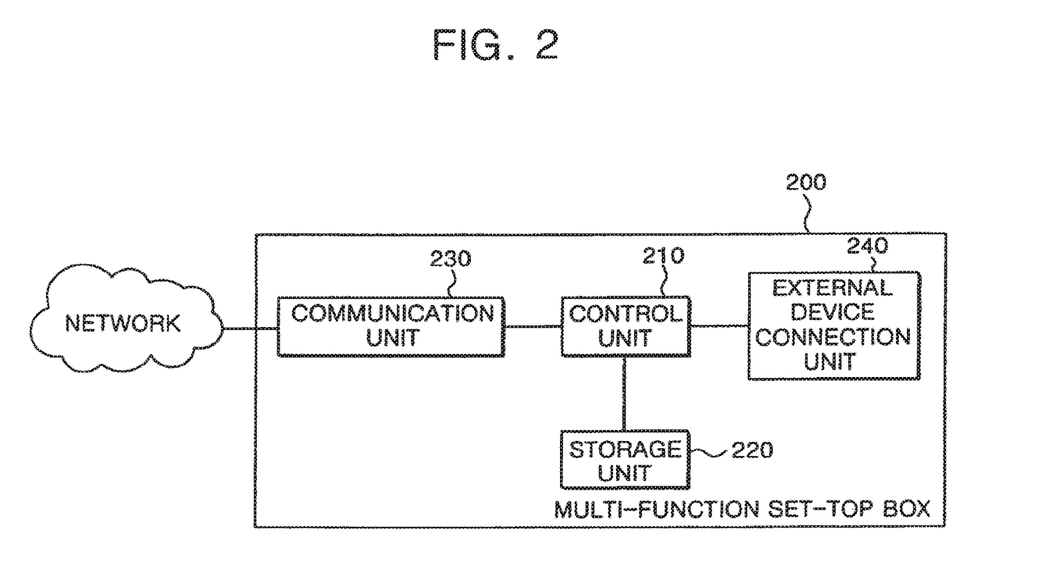
FIG. 2 is a block diagram of a user interface device in a multitasking environment according to an exemplary embodiment of the present invention.

FIG. 2 is a block diagram of a user interface device in a multitasking environment according to an exemplary embodiment of the present invention.

Referring to FIG. 2, the user interface device used in a multitasking environment is represented by a multi-function set-top box 200 which includes a control unit 210, a storage unit 220, a communication unit 230, and an external device connection unit 240.

The control unit 210 controls the storage unit 220, the communication unit 230, and the external device connection unit 240 of the multi-function set-top box 200. In particular, when there is request to execute another application while at least one application is executed, the control unit 210 determines the priorities of the already executed application and the newly executed application, determines the size of a display area for each application according to the determined priorities, and displays the application on the determined area. The priorities may be determined by the user or may be based on predefined priority information. The information about the priority and the size of the display area may be set as a default or by a user selection.

The storage unit 220 stores set information about the priorities and the sizes of display areas. The storage unit 220 may further store various items of information, including schedule information, electronic program guide (EPG) information used to receive and view broadcast programs, and content information. The communication unit 230 can connect to the network and perform various communication functions, such as Internet service, E-mail service, voice over Internet protocol (VoIP)-based voice or video phone service, and data communication service such as multimedia broadcasting content transmission.

The external device connection unit 240 is used to connect various external devices to the set-top box 200. Examples of the external devices include external storage devices, digital cameras, MP3 players, digital versatile discs (DVDs), personal video recorders (PVRs), and computers. The multi-function set-top box 200 is able to recognize the external devices, which are connected to the multi-function set-top box 200 via the external device connection unit 240, and is able to read or write data from or to the external devices. The multi-function set-top box 200 may control functions of the external devices.

Meanwhile, function control by the multi-function set-top box 200 can be performed using function keys of the multi-function set-top box 200 or function keys of a user terminal, the latter being a control device corresponding to the set-top box 200. Examples of the user terminal include a remote controller, a portable phone, and a personal digital assistant (PDA).

The remote controller can connect to the multi-function set-top box 200 using wireless local area communication technology, such as infrared communication and Bluetooth. Since the multi-function set-top box 200 has a communication function, the remote controller of the multi-function set-top box 200 will be able to have a communication terminal function, as well as a function of controlling the set-top box 200. The set-top box 200 may further comprise a remote control unit (not shown) for receiving a control signal from the remote controller.

A portable phone, a PDA, and the like may be able to connect to the set-top box 200 over a communication network, and may be able to control the set-top box 200. Alternatively, a user terminal having both a remote controller function and a portable communication terminal function may be used, or a user terminal for controlling the set-top box 200 through a wired connection may be used.

As described above, upon receipt of a request to execute another application while at least one application is being executed, the control unit 210 determines the sizes of display areas for the already executed application and the newly executed application, and displays each application on the determined area.

In the latter regard, the sizes of the display areas for the applications may be determined in response to a request from a user.

The sizes of display areas for the applications may be determined according to priority assigned to each application. The priority may be assigned in accordance with several methods.

The control unit 210 may determine the priority based on an execution order of applications. For example, the control unit 210 may assign the highest priority to the most recently executed application. Conversely, the control unit 210 may assign the lowest priority to the most recently executed application.

The control unit 210 may determine the priority of each application by referring to predefined priority information. Alternatively, the control unit 210 may determine the priority to be assigned to each application by collecting an application use history of a user and referring to the collected history. For example, the control unit 210 may assign higher priority to an application having higher use frequency and lower priority to an application having lower use frequency. If the use history of the user is used to determine the priority, user-preferred applications can be predicted. Accordingly, the priority can be efficiently determined.

The control unit 210 may determine the size of a display area for displaying each application by referring to information about the size of the display area which is determined according to each priority. Two different applications may be assigned a different-sized display area according to the setting of a system even though they have the same priority.

The two different applications may be a video call and a voice call. The video call and the voice call need different display areas. While the video call needs to display video information received from a party, the voice call has no video information to display since it does not transmit video information. The video call may be assigned a larger display area than that of the voice call even though the two applications have the same priority.

That is, while the applications have the same priority, they are assigned a different size of display area by considering features of the applications. The priority used herein may include information for differentiating the size of the display area assigned to each application from that of other applications.

Furthermore, a performance condition corresponding to the priority, as well as the size of the display area, may be predefined. The information about the priority and the size of the display area may be stored in the storage unit 220.

The information about the priority and the size of the display areas will be described by way of example, in which priority has four levels from the first level to the fourth level. The first level is the highest priority level and the fourth level is the lowest priority level. Five applications, such as television, scheduler, menu, video call, and hardware connection status indication applications, displayed at each level will be described by way of example to assist in understanding the levels.

The first priority level is a mode in which only one selected application is displayed. In the first level, the application uses 100 percent of the screen. In particular, if the application performs a single operation, the operation status may be displayed on a full screen.

Each of the television application, the scheduler application, the menu application, the video call application, and the hardware connection status indication application may be displayed on a full screen when it operates at the first priority level.

Specifically, the television application displays a received broadcast program on a full screen. The scheduler application displays a year=s schedule. The menu application displays a top menu, submenus, and movement between the menus. The video call application displays its screen and a party=s screen on a full screen. The hardware connection status indication application displays connected hardware and, if hardware is selected, displays a list of photographs, songs, and the like of the selected hardware in a thumb nail form.

As described above, an executed application having the first priority level is displayed on a full screen. When the application is an application that displays information, detailed content is displayed. That is, the application having the first priority level is assigned the widest display area so that the greatest amount of information is displayed.

The second priority level is a mode in which a selected application is displayed together with other applications. The second level application is expanded to occupy about 60 percent of a full screen. Information provided by the second level application may be displayed in an abstract form. Screen occupation size and information abstract level may be determined according to the setting of a system.

Each of the television application, the scheduler application, the menu application, the video call application, and the hardware connection status indication application may be displayed on 60 percent of the full screen when it operates at the second priority level.

Specifically, the television application displays a received broadcast program on 60 percent of the full screen. The scheduler application displays a month=s schedule. The menu application displays a top menu, submenus, and movement between the menus. The video call application displays its screen and a party=s screen. The hardware connection status indication application displays connected hardware and, if each hardware is selected, displays a list of photographs, songs, and the like of the selected hardware in a thumb nail form.

Other applications simultaneously executed with the second level application may be displayed on a remaining screen area, which is not occupied by the second level application, according to each set priority.

The third priority level is a mode in which an application is displayed together with other applications including a selected application. That is, the third level application is a non-selected application that is displayed together with the second selected level application. The third level application may occupy 10 to 20 percent of a full screen. The third level application provides only essential information.

Each of the television application, the scheduler application, the menu application, the video call application, and the hardware connection status indication application may be displayed on 10 to 20 percent of the full screen when it operates at the third level.

Specifically, the television application displays a received broadcast program on an assigned area. The scheduler application displays a day=s schedule. The menu application displays only a top menu. The video call application displays only a party=s screen. The hardware connection status indication application displays only connected hardware.

As described above, the second level application and the third level application are applications which are simultaneously executed and displayed. One application may be either the second level application or the third level application depending on whether the application is currently selected. The currently selected application is the second level application. The second level application is assigned a display area which is, by a predetermined size, larger than the display area assigned to the third level application.

In this regard, the second level application may be changed to the third level application, and the third level application may be changed to the second level application, depending on whether the second level application or the third level application is currently selected. Furthermore, screen occupation sizes assigned to the second level application and the third level application may be adjusted depending on the number of displayed applications.

The fourth priority level is a mode in which an application is executed in background and is not displayed on a screen. The fourth level application may provide information to a user through an indicator, if necessary.

Each of the television application, the scheduler application, the menu application, the video call application and the hardware connection status indication application may be executed at the fourth level, as follows.

The television application does not display a received broadcast program on a screen. However, the television application may output only sound of the received broadcast program according to the setting of a system. The scheduler application notifies a user of a schedule on a set time when a notification function is set. The video call application operates in a standby state. The menu application and the hardware connection status indication application do not work.

Meanwhile, the priority level assigned to each of the above-stated applications may be changed according to a user request. When the application receives a user request to change the priority level that is assigned to an application, the device can change the priority level assigned to the application in response to user input. The priority level may be sequentially changed from the first level to the fourth level or from the fourth level to the first level, or it may be changed to the priority specified by the user. When the priority is sequentially changed, continuous circulation is possible according to a selection. For example, if the priority assigned to an application is sequentially changed in an order of the first level |the second level |the third level |the fourth level, the priority may be changed to the first level when the priority arrives at the fourth level. Of course, each time the priority of each application is changed, the size of the display area assigned to the application is changed accordingly.

A display result according to each priority will be described with reference to the accompanying drawings.

FIGS. 3A, 3B, 3C, 3D and 3E illustrate examples of a display result according to priority.

Figure 3A:
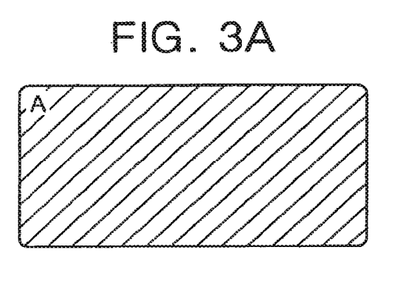
FIGS. 3A, 3B, 3C, 3D and 3E illustrate display results according to priority in a user interface according to an exemplary embodiment of the present invention.

FIG. 3A illustrates a display result when a first level application is executed. In FIG. 3A, a slant line portion indicates a display area for the first level application. Referring to FIG. 3A, the first level application is displayed on a full screen.

Figure 3B:
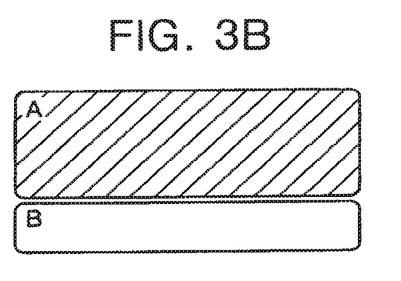

FIG. 3B illustrates a display result when a second level application is executed. In FIG. 3B, a slant line portion indicates a display area for the second level application. Further referring to FIG. 3B, the second level application is displayed on 60 percent of a full screen. In addition, another application is displayed on an area excluding the area assigned to the second level application.

Figure 3C:
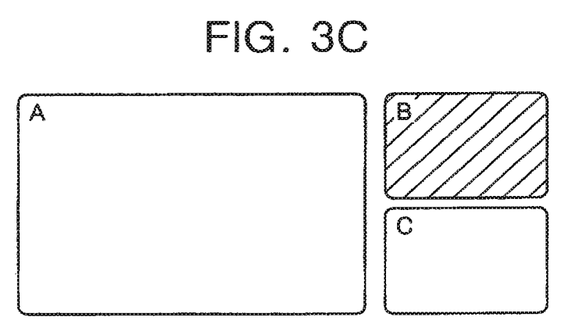

FIG. 3C illustrates a display result when a third level application is executed. In FIG. 3C, a slant line portion indicates a display area for the third level application. Further referring to FIG. 3C, the third level application is displayed on 20 percent of a full screen. In addition, the third level application and other third level applications are uniformly assigned an area excluding the 60 percent display area occupied by the second level application. That is, the third level applications are assigned 20 percent of the full screen as a display area.

Figure 3D:
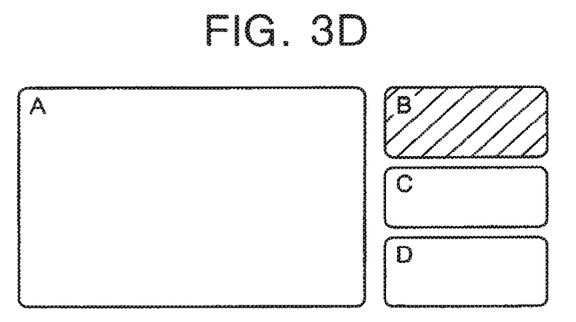

FIG. 3D illustrates another display result when a third level application is executed. In FIG. 3D, a slant line portion indicates a display area for the third level application. Further referring to FIG. 3D, a display result of the second level application and three third level applications is shown, unlike the display result of the second level application and two third level applications in FIG. 3C.

In FIG. 3D, the second level application occupies 60 percent of a full screen, similar to the second level application of FIG. 3C. The third level applications of FIG. 3D are uniformly assigned a remaining 40 percent of the area.

As a result, the third level applications of FIG. 3D are assigned 40/3, i.e., about 17 percent of the display area.

Figure 3E:
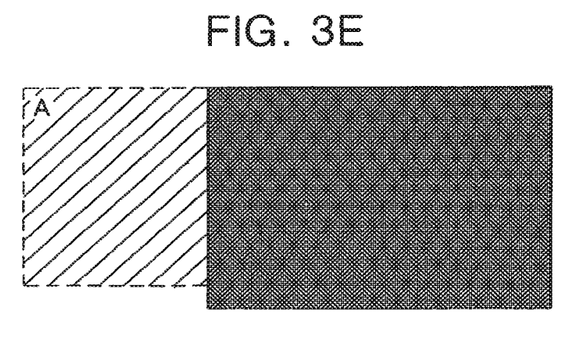

FIG. 3E illustrates another display result when a fourth level application is executed. In FIG. 3E, a slant line portion indicates a display area for the fourth level application. The fourth level application operates in background, and is not actually displayed.

When beginning to execute the third new level application during the display of other applications in the form illustrated in FIG. 3C, the multi-function set-top box can change the display form to the form illustrated in FIG. 3D. Conversely, when the third level application is terminated during the display of the applications in the form illustrated in FIG. 3D, the multi-function set-top box can change the display form to the form illustrated in FIG. 3C.

When beginning to execute the first level new application during the display of the applications in the form shown in FIG. 3C or 3D, the multi-function set-top box may change the display form to the form shown in FIG. 3A.

That is, when beginning to execute a new application or terminating an executed application, the multi-function set-top box can set or change the display form. In this case, the priority of the application is reflected in the determination of the display area assigned to the application and the display form of the application.

Meanwhile, the multi-function set-top box may assign a different-sized display area, depending on whether the application is executed by a user or a party. A phone call is a representative application which is executed by a user or a party. If the user makes a call, it means that the call is made by the user, and if the user receives a call, it means that a phone call is made by a party. The multi-function set-top box may assign a larger display area for a phone call application making a call than for a phone call application receiving a call.

The multi-function set-top box may determine the size of the display area assigned to each application according to execution of the application or a user selection.

For example, in the case where a user makes a call while viewing a television broadcast program, the set-top box can change the sizes of the display areas assigned to a phone call application to about 80, 20 and 40 percent of the full screen to display the process of inputting a party=s telephone number, the signaling process for connection to a party, and the conversation process after the connection is established.

In the case where a door phone rings, indicating that there is a visitor, while a user is viewing a television broadcast program, the device assigns 10 percent of the full screen to notify the user of ringing. When the door phone rings, the user may desire to check the visitor. Upon receipt of a user request to check the visitor, the device can expand the display area of the door phone to 60 percent of the full screen.

In the above-described examples, the percentages of 80, 20, 40, 10, and 60 percent have been only suggested to assist in understanding the present invention, but do not limit the present invention. The set values for changing the size of the display areas according to an application process may be set considering features of each application. The settings may follow defaults of the system or may be set by the user.

The priority of each application may be determined relative to other applications which are simultaneously executed.

The assignment of priority and the related examples have been described to assist in understanding the present invention, and are not intended to limit the present invention. The priority described as having the fourth levels may have two levels, three levels or five levels, etc. and the display area may be variously sized.

Hereinafter, exemplary embodiments of the present invention will be described in which a user begins to make a phone call while viewing a television broadcast program.

Figure 4A:
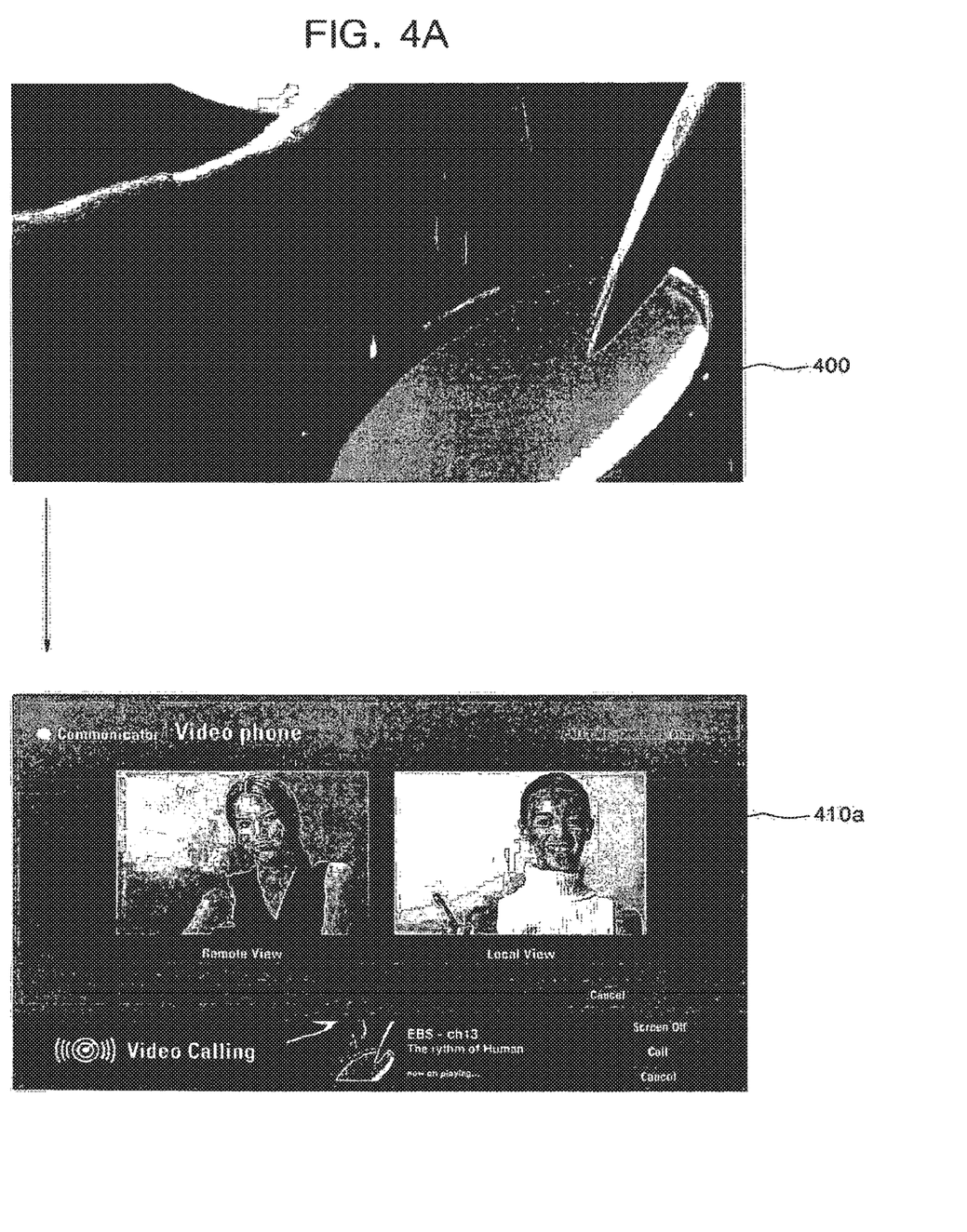
FIG. 4A illustrates a change in a display result when a user makes a call while viewing a television broadcast program in a user interface according to an embodiment of the present invention.

FIG. 4A illustrates a change in a display result when a user makes a call while viewing a television broadcast program.

In FIG. 4A, reference numeral 400 indicates a display form when only a television application is executed. In this case, a broadcast program is displayed on a full screen. Reference numeral 410*a* indicates a display form when a user makes a call while viewing a television program. A telephone application occupies 80 percent of the full screen and the broadcast program occupies the remainder of the screen.

Figure 4B:
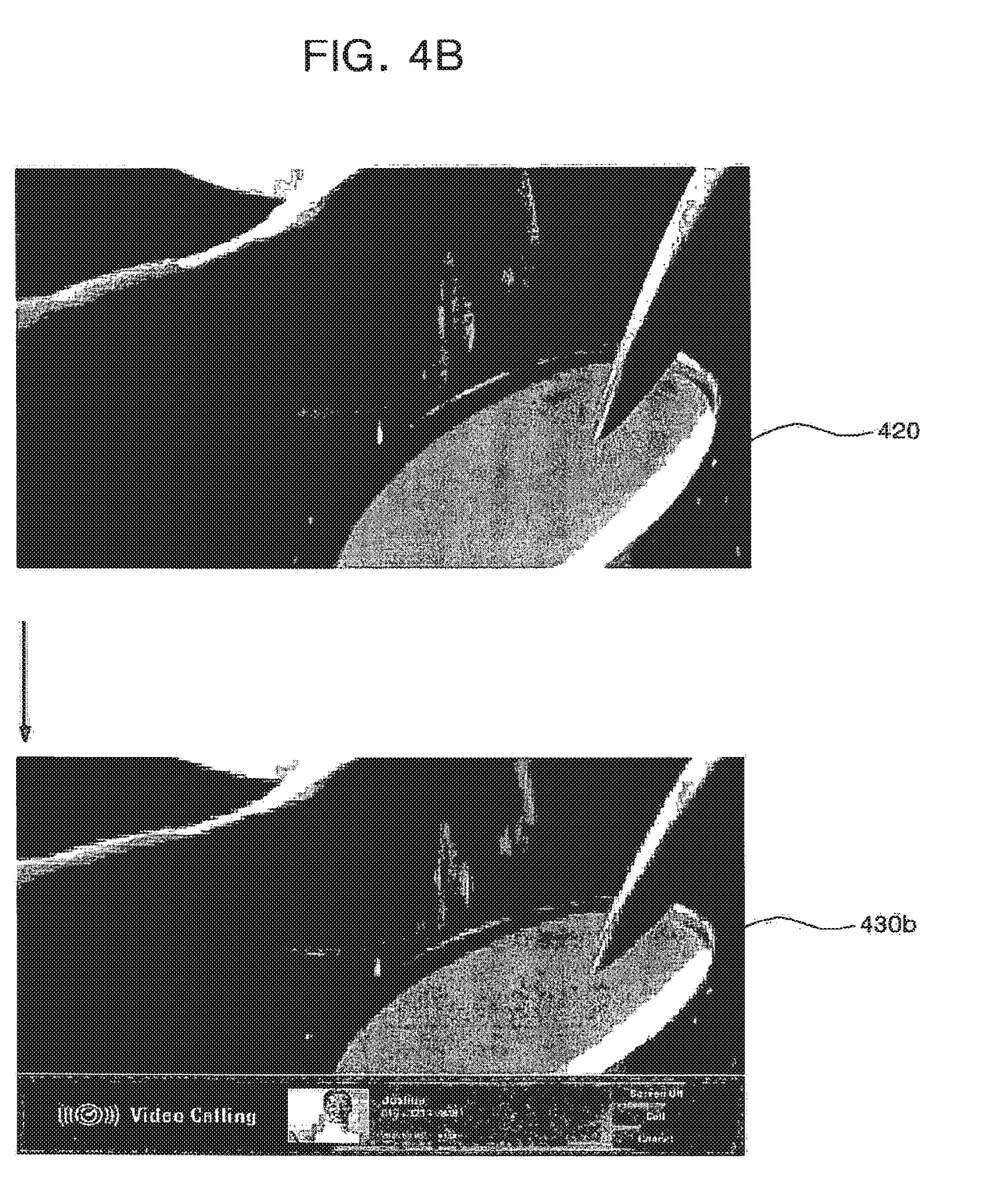
FIG. 4B illustrates a change in a display result when a user receives a call while viewing a television broadcast program in a user interface according to an embodiment of the present invention.

FIG. 4B illustrates a change in a display result when a user receives a phone call while viewing a television broadcast program.

In FIG. 4B, reference numeral 420 indicates a display form when only a television application is executed. In this case, when there is an incoming call, the display form is changed as indicated by reference numeral 430*b*. As indicated by reference numeral 430*b*, the telephone application occupies 20 percent of a full screen and a broadcast program occupies 80 percent of the full screen.

Figure 4C:
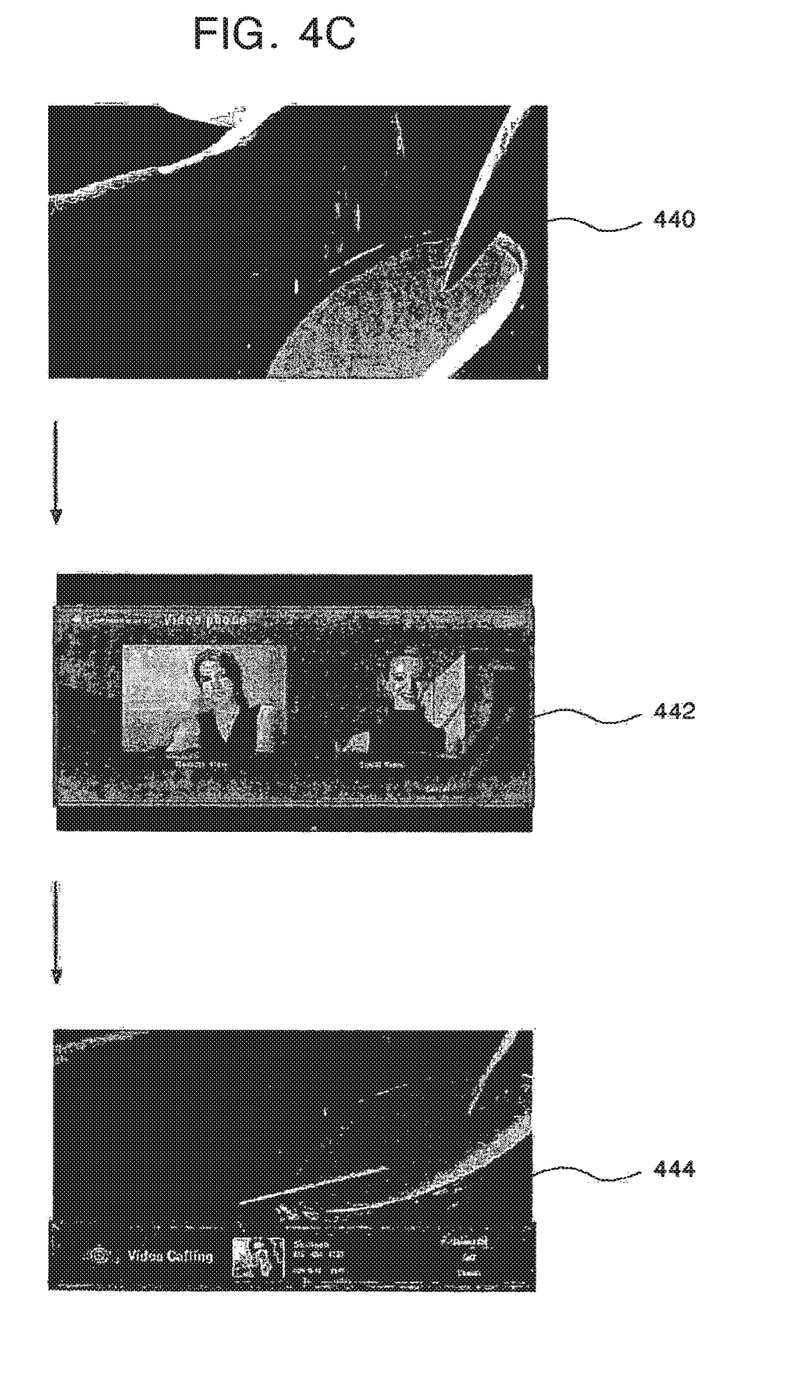
FIG. 4C illustrates a change in a display result when a user makes a call while viewing a television broadcast program in a user interface according to another embodiment of the present invention.

FIG. 4C illustrates a change in a display result when a user makes a call while viewing a television broadcast program according to another embodiment of the present invention.

Referring to FIG. 4C, no application is assigned an independent display area, but a newly executed application is displayed in an overlapping relation with already executed applications. In particular, FIG. 4C shows a change in display form when a video call application is executed while a television broadcast program is being viewed.

In addition, FIG. 4C shows a display area assigned to the video call, the size of which is changed as the video call proceeds. When the user executes only the television application, the television application is displayed on a full screen, as illustrated by reference numeral 440 in FIG. 4C. If a user attempts to make a video call while viewing a television broadcast program, the video call application is displayed on 80 percent of the full screen, as indicated by reference numeral 442. When the video call is established, the video call application is displayed on 20 percent of the full screen, as indicated by reference numeral 444.

If another application (e.g., a schedule check application) is executed during the phone call, the display form is changed.

Hereinafter, the user interface method in a multitasking environment according to an exemplary embodiment of the present invention will be described with reference to the accompanying drawings.

Figure 5:
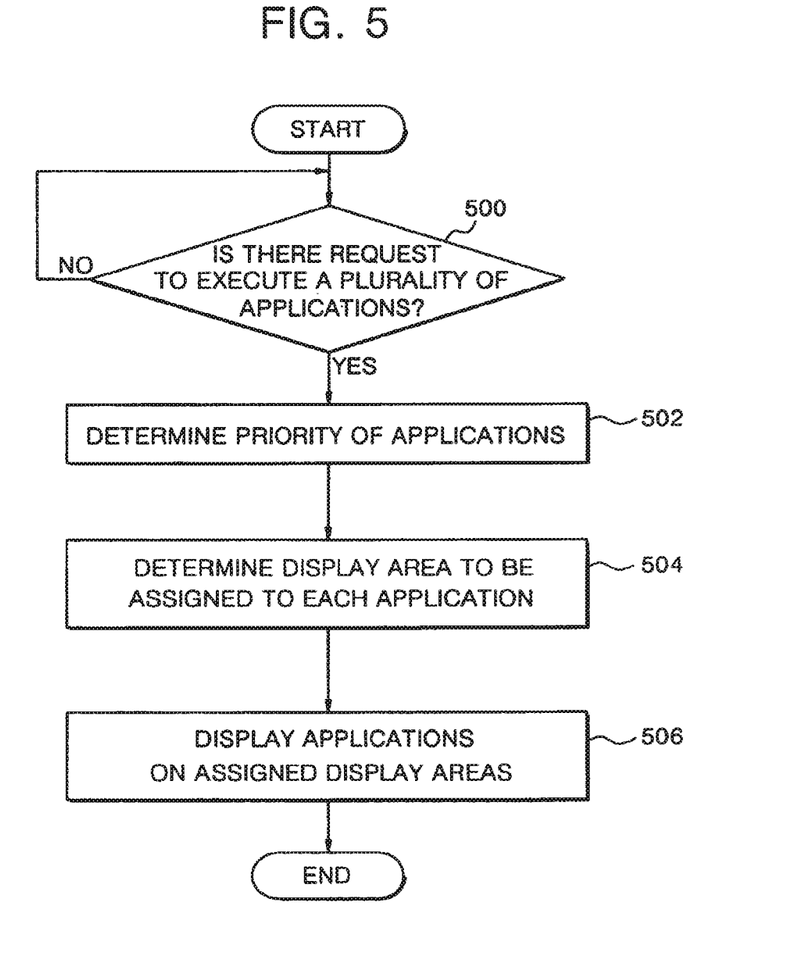
FIG. 5 is a flowchart illustrating a user interface method in a multitasking environment according to an embodiment of the present invention.

FIG. 5 is a flowchart illustrating a user interface method in a multitasking environment according to an embodiment of the present invention.

When the device receives a request to execute another application during the execution of at least one application (S500), it determines the priorities of the already executed application and the newly executed application (S502). When a plurality of applications are not being executed, but only one application is being executed, the application is displayed on a full screen, which will no longer be described. The device may determine the priority of each application by referring to predefined information (S502). The device determines the size of a display area for each application according to the determined priority (S504). The size of the display area may be determined by referring to predefined information. The device then displays each application on the determined area (S506).

A determination of the priority and the size of the display area may be made according to a user selection. However, since the user selection is inconvenient, the predefined information may be typically referred to.

As described above, according to the present invention, it is possible to display a new executed application simultaneously with display of applications already being executed. It is possible to provide a flexible screen to a user and naturally induce the attention of the user by differentiating the sizes of the display areas assigned to a plurality of applications according to determined priority in displaying the applications.

While the present invention has been described as being applied to the multi-function set-top box in order to provide an understanding the present invention, the present invention is not limited to the multi-function set-top box. The present invention may be equally applied to all devices that provide a display-based user interface.

With the user interface method and device in a multitasking environment according to the present invention, it is possible for a user to view a plurality of applications on a screen at the same time by displaying the plurality of applications and differentiating the sizes of the display areas, if necessary. This can improve user convenience.

While the present invention has been described with reference to exemplary embodiments thereof, it will be understood by those skilled in the art that various changes in form and detail may be made therein without departing from the scope of the present invention as defined by the following claims.

What is claimed is:

1. A method of controlling an apparatus, the method comprising:
    based on a first user input for executing a first application, displaying a first screen corresponding to the first application on an entire area of a display;
    based on a second user input for executing a second application while the first screen is displayed on the entire area of the display, displaying a second screen corresponding to the second application on the display, wherein the second screen overlaps a portion of the first screen;
    based on a status of the second application after receiving the second input, while the second screen overlapping the portion of the first screen is displayed, displaying the first screen and the second screen without overlapping each other, by changing a size of the first screen corresponding to the first application; and
    based on a third user input for selecting one of the first application and the second application while the first screen and the second screen are displayed without overlapping each other, displaying a screen corresponding to the selected one application on the entire area of the display.

2. The method according to claim 1, the displaying the first screen and the second application without overlapping each other comprises changing the size of the displayed first screen and maintaining the size of the displayed second screen so as not to overlap each other on the entire area of the display.

3. The method according to claim 1, the displaying the first screen and the second screen without overlapping each other comprises adjusting the size of the displayed first screen and displaying the first screen, of which the size is adjusted, on a remaining display area excluding a partial display area of the display while the second screen is displayed on the partial display area.

4. The method according to claim 1, further comprising, separately controlling each of the first application and the second application while the first screen and the second screen are displayed without overlapping each other.

5. The method according to claim 1, wherein at least one among the first application and the second application comprises at least one among a television application, a scheduler application, a menu application, a video call application, a hardware connection status indication application, and a telephone application.

6. The method according to claim 1, wherein the second application is an application that is used most recently among a plurality of applications.

7. The method according to claim 1, further comprising displaying an indicator related to the unselected one application that is not displayed on the screen.

8. A display apparatus comprising:
    a display; and
    a processor configured to:
        based on a first user input for executing a first application, display a first screen corresponding to the first application on an entire area of the display;
        based on a second user input for executing a second application while the first screen is displayed on the entire area of the display, display a second screen corresponding to the second application on the display, wherein the second screen overlaps a portion of the first screen;
        based on a third user input related to the second application being received a status of the second application after receiving the second input, while the second screen overlapping the portion of the first screen is displayed, display the first screen and the second screen without overlapping each other, by changing a size of the first screen corresponding to the first application; and
        based on a third user input for selecting one of the first application and the second application while the first screen and the second screen are displayed without overlapping each other, display a screen corresponding to the selected one application on the entire area of the display.

9. The display apparatus according to claim 8, wherein the processor is further configured to change the size of the displayed first screen and maintain the size of the displayed second screen so as not to overlap each other on the entire area of the display.

10. The display apparatus according to claim 8, wherein the processor is further configured to adjust the size of the displayed first screen and control to display the first screen, of which the size is adjusted, on a remaining display area excluding a partial display area of the display while the second screen is displayed on the partial display area.

11. The display apparatus according to claim 8, wherein the processor is further configured to control separately each of the first screen and the second screen while the first application and the second application are displayed without overlapping each other.

12. The display apparatus according to claim 8, wherein the processor is further configured to control to display an indicator related to the unselected one application that is not displayed on the screen.

13. A non-transitory computer-readable storage medium storing instructions configured to cause a processor to:

based on a first user input for executing a first application, display a first screen corresponding to the first application on an entire area of a display;

based on a second user input for executing a second application while the first screen is displayed on the entire area of the display, display a second screen corresponding to the second application on the display, wherein the second screen overlaps a portion of the first screen;

based on a status of the second application after receiving the second input, while the second screen overlapping the portion of the first screen is displayed, display the first screen and the second screen without overlapping each other, by changing a size of the first screen corresponding to the first application; and based on a third user input for selecting one of the first application and the second application while the first screen and the second screen are displayed without overlapping each other, display a screen corresponding to the selected one application on the entire area of the display.

14. The non-transitory computer-readable storage medium according to claim 13, wherein the instructions are further configured to cause the processor to change the size of the displayed first screen and maintain the size of the displayed second screen so as not to overlap each other on the entire area of the display.

15. The non-transitory computer-readable storage medium according to claim 13, wherein the instructions are further configured to cause the processor to adjust the size of the displayed first screen and control to display the first screen, of which the size is adjusted, on a remaining display area excluding a partial display area of the display while the second application is displayed on the partial display area.

16. The non-transitory computer-readable storage medium according to claim 13, wherein the instructions are further configured to cause the processor to separately control each of the first screen and the second screen while the first application and the second application are displayed without overlapping each other.

17. The non-transitory computer-readable storage medium according to claim 13, wherein the instructions are further configured to cause the processor to control to display an indicator related to the unselected one application that is not displayed on the screen.

* * * * *